United States Patent [19]

Fleckenstein

[11] Patent Number: 4,549,245

[45] Date of Patent: Oct. 22, 1985

[54] CAPACITANCE-TYPE MATERIAL LEVEL PROBE AND METHOD OF MANUFACTURE

[75] Inventor: Phillip P. Fleckenstein, Port Huron, Mich.

[73] Assignee: Berwind Corporation, Philadelphia, Pa.

[21] Appl. No.: 652,853

[22] Filed: Sep. 21, 1984

Related U.S. Application Data

[62] Division of Ser. No. 419,776, Sep. 20, 1982, Pat. No. 4,499,641.

[51] Int. Cl.$^4$ .................. H01G 5/28; G01R 27/26
[52] U.S. Cl. .................. 361/284; 73/304 C; 324/61 P
[58] Field of Search ............ 73/304 C, 304 R; 324/61 P; 361/284; 29/25.41

[56] References Cited

U.S. PATENT DOCUMENTS

| | | | |
|---|---|---|---|
| 1,837,723 | 12/1931 | McGraw | 264/262 |
| 2,444,997 | 7/1948 | Lovesey | 18/59 |
| 2,699,523 | 1/1955 | Meyers | 361/284 |
| 2,852,937 | 9/1958 | Maze | 73/304 |
| 2,955,466 | 10/1960 | Coles | 73/290 |
| 3,109,882 | 11/1963 | Maltby | 361/284 X |
| 3,119,266 | 1/1964 | Atkinson | 73/304 |
| 3,339,411 | 9/1967 | Riffie | 73/304 |
| 3,879,644 | 4/1975 | Maltby | 73/304 C X |
| 3,988,668 | 10/1976 | Bowers | 73/304 C X |
| 4,025,846 | 5/1977 | Franz et al. | 324/61 P |
| 4,178,623 | 12/1979 | Emmerich et al. | 361/284 |

FOREIGN PATENT DOCUMENTS

| | | |
|---|---|---|
| 1275777 | 8/1968 | Fed. Rep. of Germany . |
| 52-29770 | 3/1977 | Japan . |

Primary Examiner—Donald A. Griffin
Attorney, Agent, or Firm—Barnes, Kisselle, Raisch, Choate, Whittemore & Hulbert

[57] ABSTRACT

A capacitance probe and method of probe manufacture for material level sensing systems and like applications. The probe includes a probe rod, a tubular guard coaxially surrounding the rod intermediate the rod ends, and insulation material formed as an integral piece in an injection molding operation surrounding the rod between the rod and guard and also surrounding and radially overlapping axially spaced ends of the tubular guard. One end of the rod and a portion of the guard intermediate its ends are exposed through the insulation material. The molded assembly is captured within a nipple or the like for mounting to a material vessel such that the exposed surfaces of the rod and guard are disposed internally of the vessel for capacitance coupling to material therewithin.

1 Claim, 1 Drawing Figure

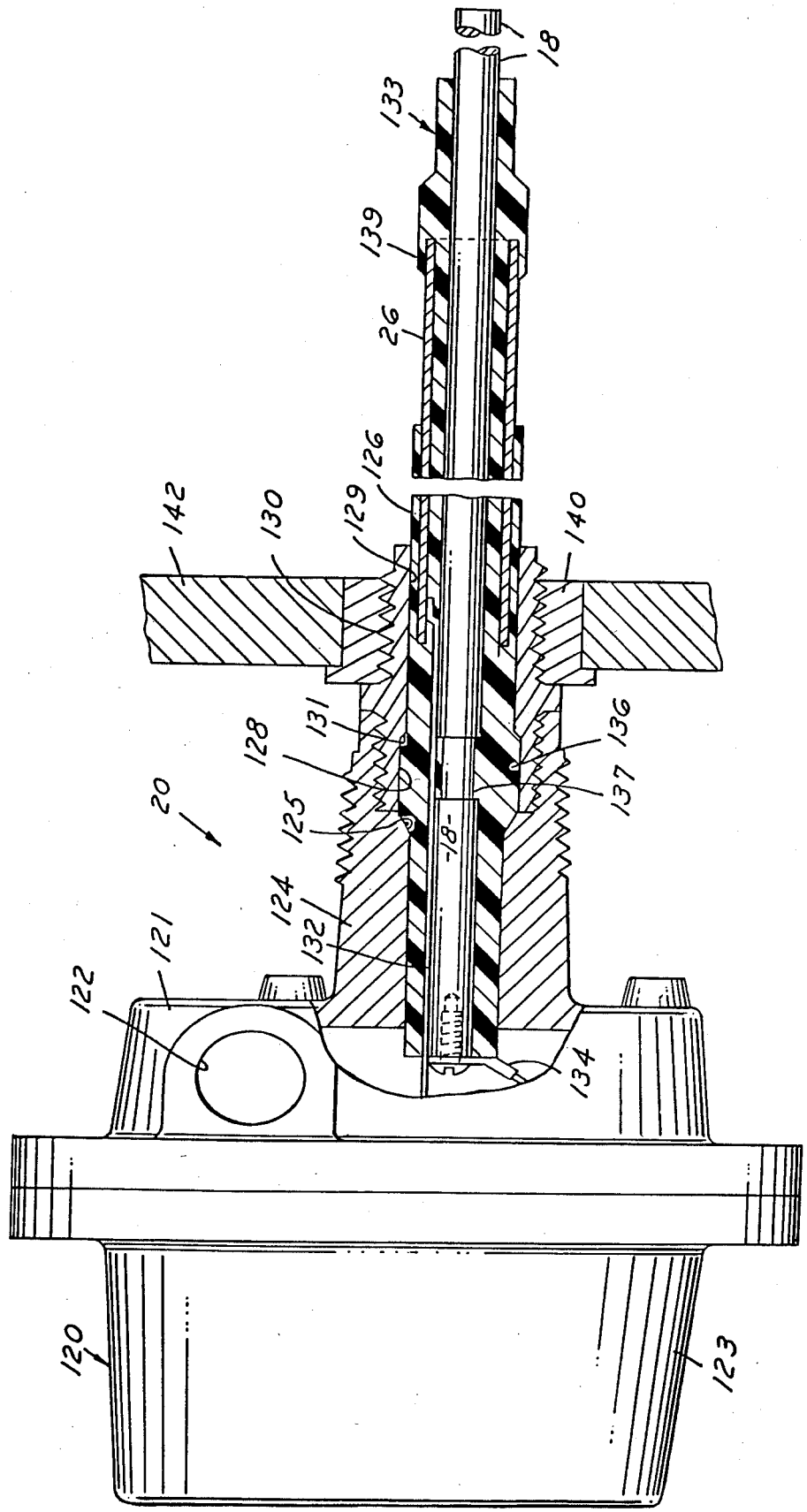

CAPACITANCE-TYPE MATERIAL LEVEL PROBE AND METHOD OF MANUFACTURE

This is a division of application Ser. No. 419,776, filed Sept. 20, 1982 and entitled "Capacitance-Type Material Level Probe and Method of Manufacture", now U.S. Pat. No. 4,499,641.

The present invention relates to material level monitors and controls, and more particularly to a capacitancetype antenna or probe for use in an r.f. system for measuring level of fluent material in a storage vessel. Yet more specifically, the invention relates to an improved guarded-type capacitance probe and to a method for manufacture thereof.

BACKGROUND AND OBJECTS OF THE INVENTION

Capacitance material level probes of the type to which the present invention is directed typically comprise a central rod surrounded by a first layer of insulation, with the rod tip being exposed to act as a measurement antenna when mounted within a storage vessel. A tubular guard shield surrounds the first insulation layer and is itself surrounded by a second layer of insulation. A portion of the tubular guard shield adjacent to the rod tip is exposed and is adapted to be electrically energized separately from the rod so as to direct probe energy outwardly into the tank rather than through any material which may be coated onto the probe body. The second insulation layer is clamped within a nipple which is adapted to be threaded into a gland on a material vessel wall with the probe rod and guard shield projecting into the tank as described.

Measurement probes of the described character heretofore proposed in the art typically include the insulation layers and the guard shield as separate tubular elements telescopically received over the central rod. To obtain desired sealing within a pressurized vessel, it has often been necessary to crimp or squeeze the tip of the tubular guard shield around the first insulation layer to close off a leakage path therebetween. The separate tubular insulation elements and assembly thereof to the probe rod are expensive, and it is now proposed to perform the assembly operation and provide the necessary insulation in a single step by injection molding insulation material surrounding and between fixtured guard shield and probe elements. However, considerable shrinkage is encountered with thermosetting plastics suitable for this application, and crimping of the guard shield tip, which is undesirable in any event because it requires an extra assembly operation, is not entirely effective.

An object of the present invention, therefore is to provide an improved capacitance-type probe of the character described which is adequately and securely sealed at the tip of the guard shield.

Another object of the invention is to provide an economical method of manufacturing such a probe.

BRIEF DESCRIPTION OF THE DRAWINGS

The invention, together with additional objects, features and advantages thereof, will be best understood from the following description, the appended claims and the accompanying drawing which is a fragmentary, partially sectioned elevational view of a probe assembly in accordance with a presently preferred embodiment of the invention.

DETAILED DESCRIPTION OF PREFERRED EMBODIMENTS

Referring to the drawing, a probe assembly 20 in accordance with the invention is illustrated therein as comprising a closed metal housing 120 which has a base 121 and a cover 123 separable therefrom. System electronics, which do not per se form part of the present invention, may be disposed within housing 120 and connected to a remote power source and/or display through the opening 122 in base 121. System electronics presently preferred in practice of the present invention are disclosed in copending application Ser. No. 411,527 filed Aug. 25, 1982 and assigned to the assignee hereof, now U.S. Pat. No. 4,499,766.

A hollow nipple 124 projects from housing base 121. The housing-remote end of nipple 124 is internally threaded up to an inwardly tapering shoulder 125 coaxial with nipple 124. A hollow externally threaded adapter 130 is received within nipple 124. The interior of adapter 130 is formed at a first diameter 128 which blends into a second lesser diameter 129 by means of a tapering shoulder 131. Diameters 128,129 and shoulder 131 are coaxial in assembly with nipple 124. The housing-remote end of adapter 130 is adapted to be threadably received into an internally threaded gland 140 mounted on the side or top wall of a material storage vessel 142.

Sealingly captured by nipple 124 and adapter 130 is a probe subassembly 133 comprising the probe measurement element 18, the guard shield 26 and a one-piece unitarily formed body of insulating material 126 formed therearound and therebetween. More specifically, measurement element 18 comprises a solid rod of conductive non-corrosive metallic material such as stainless steel having an internally threaded opening at one end adapted for connection as at 134 within housing 120 to the sensor electronics (not shown). Guard shield 26 comprises a hollow cylindrical tube of conductive metallic material such as stainless steel coaxially surrounding and radially spaced from probe rod 18. Guard shield 26 in the preferred embodiment of the drawing is substantially shorter in the axial dimension than is probe rod 18 and is spaced intermediate the rod ends. The guard shield extends from a position located radially inwardly of the housing-remote end of adapter 130 to a point spaced from the housing-remote end of probe rod 18. An insulated conductor 132 is soldered or otherwise electrically connected to guard shield 26 and extends along rod 18 into housing 120 for connection to the sensor electronics separately from the rod element.

Insulating material 126 includes a first portion surrounding probe rod 18 internally of guard shield 26 and a second portion externally surrounding guard shield 26. The housing-remote end of probe rod 18 is exposed, i.e. not covered by insulating material. Insulating material 126 surrounds and radially overlaps axially spaced ends of guard shield 26, with a circumferentially continuous portion of the guard shield intermediate its ends being exposed from the radial direction, i.e. not covered by insulating material. In particular, insulating material is integrally formed as a circumferentially continuous lip 139 to radially overlap and sealingly capture the housing-remote end of guard shield 26. A circumferentially continuous radial shoulder 136 is formed on insulating material 126, and has tapering axial faces which are sealingly captured in assembly between shoulder 125 on nipple 124 and shoulder 131 on adapter 130. A circumferential notch 137 preformed on rod 18 is filled with insulating material radially inwardly of shoulder 136 to hold the rod in axial position. It will be appreciated that the body of insulating material 126 illustrated in the drawing is symmetrical about the probe axis.

To manufacture probe assembly 20, guard shield 26 (with conductor 132 attached) and probe rod 18 are first fixtured in coaxial orientation within a suitable mold (not shown). Insulating material 126 is then unitarily formed in a single operation as an integral structure by injection molding the material around and between the guard and probe elements as described. As the insulating material coo.ls and shrinks, the lip 139 thereof which radially overlaps the housing-remote end of guard shield 26 squeezes the guard shield edge so as to form a tight, pressure resistant seal. It will be appreciated that the lengths of shield 26 and probe rod 18 are chosen depending upon application. Any suitable heat-resistant and non-corrosive material may be used for insulating material 126. Material marketed by Phillips Petroleum Company under the trademark RYTON is presently preferred.

The invention claimed is:

1. A capacitance probe for use in material level sensing applications or the like comprising an elongated probe element having a central axis, a tubular guard co-axially surrounding and radially spaced from said probe element, said probe element having a greater axial dimension than said guard and projecting from one end of said guard, one-piece unitarily formed insulation means entirely surrounding said probe element between said guard and said probe element, and surrounding and radially overlapping axially spaced ends of said guard, a portion of said guard intermediate said ends and an end portion of said probe element projecting from said one end of said guard being exposed through said one-piece insulation means, and means capturing said insulation means and adapted for mounting said probe to a material vessel with said exposed portions of said guard and probe element being remote from said capturing means for disposition internally of said vessel.

* * * * *